(12) United States Patent
Policht

(10) Patent No.: US 11,947,041 B2
(45) Date of Patent: Apr. 2, 2024

(54) CODED OPTICAL TRANSMISSION FOR OPTICAL DETECTION

(71) Applicant: Analog Devices, Inc., Norwood, MA (US)

(72) Inventor: Alexander Edward Policht, Boston, MA (US)

(73) Assignee: Analog Devices, Inc., Norwood, MA (US)

( * ) Notice: Subject to any disclaimer, the term of this patent is extended or adjusted under 35 U.S.C. 154(b) by 1165 days.

(21) Appl. No.: 16/293,441

(22) Filed: Mar. 5, 2019

(65) Prior Publication Data
US 2020/0284881 A1    Sep. 10, 2020

(51) Int. Cl.
| G01S 7/481 | (2006.01) |
| G01S 7/48 | (2006.01) |
| G01S 7/4865 | (2020.01) |
| G01S 17/89 | (2020.01) |

(52) U.S. Cl.
CPC .......... *G01S 7/4817* (2013.01); *G01S 7/4808* (2013.01); *G01S 7/4865* (2013.01); *G01S 17/89* (2013.01)

(58) Field of Classification Search
CPC .... G01S 7/4817; G01S 7/4808; G01S 7/4865; G01S 17/89; G01S 17/894
See application file for complete search history.

(56) References Cited

U.S. PATENT DOCUMENTS

| 4,129,780 A | 12/1978 | Laughlin |
| 5,198,657 A | 3/1993 | Trost et al. |
| 5,565,982 A | 10/1996 | Lee et al. |
| 6,392,747 B1 | 5/2002 | Allen et al. |
| 8,242,476 B2 | 8/2012 | Mimeault et al. |
| 8,310,655 B2 | 11/2012 | Mimeault |
| 8,427,649 B2 | 4/2013 | Hays et al. |
| 9,285,477 B1 | 3/2016 | Smith et al. |
| 9,310,471 B2 | 4/2016 | Sayyah et al. |
| 9,897,689 B2 | 2/2018 | Dussan |

(Continued)

OTHER PUBLICATIONS

Horaud, Radu, et al., "An Overview of Depth Cameras and Range Scanners Based on Time-of-Flight Technologies", Machine Vision and Applications Journal, 27(7), (2016), 17 pgs.

(Continued)

*Primary Examiner* — Luke D Ratcliffe
(74) *Attorney, Agent, or Firm* — Schwegman Lundberg & Woessner, P.A.

(57) ABSTRACT

In an optical detection system, a coded transmission scheme can be used to provide scene illumination. For example, a transmitter can include transmit elements that can be controlled individually or in groups to provide specified modulated (e.g., on-off-keyed) waveforms corresponding to specified transmit code sequences. Light reflected or scattered by an object can be detected by an optical receiver, such as a single-pixel detector. Contributions to the received optical signal corresponding to the respective transmit code sequences can be separated using a correlation-based technique, even when such contributions overlap in time. Regions of a field-of-regard illuminated by ones or groups of the transmit elements can be selected or adjusted, such as to provide controllable spatial (e.g., angular) selectivity of which portions of the field-of-regard are illuminated by particular transmit signals.

20 Claims, 11 Drawing Sheets

(56) References Cited

U.S. PATENT DOCUMENTS

| | | |
|---|---|---|
| 10,042,159 B2 | 8/2018 | Dussan et al. |
| 10,185,028 B2 | 1/2019 | Dussan et al. |
| 2008/0059015 A1 | 3/2008 | Whittaker et al. |
| 2009/0059201 A1 | 3/2009 | Willner et al. |
| 2015/0028213 A1 | 1/2015 | Weinberg et al. |
| 2015/0378187 A1 | 12/2015 | Heck et al. |
| 2016/0209498 A1 | 7/2016 | Kanter et al. |
| 2017/0270376 A1 | 9/2017 | Aina |
| 2018/0100928 A1 | 4/2018 | Keilaf et al. |
| 2018/0143304 A1* | 5/2018 | Rosenzweig ......... G01S 7/4815 |
| 2018/0232947 A1 | 8/2018 | Nehmadi et al. |
| 2018/0306908 A1 | 10/2018 | Meng et al. |
| 2019/0094346 A1* | 3/2019 | Dumoulin ............... G01S 17/89 |
| 2019/0353787 A1* | 11/2019 | Petit ........................ G01S 7/484 |
| 2021/0072382 A1* | 3/2021 | Kashmiri ............... G01S 17/26 |

OTHER PUBLICATIONS

Kim, Gunzung, et al., "Independent Biaxial Scanning Light Detection and Ranging System Based on Coded Laser Pulses without Idle Listening Time", Sensors 18, (Sep. 2018), 20 pgs.

Kim, Gunzung, "LIDAR pulse coding for high resolution range imaging at improved refresh rate", Optics Express, 24(21), (Oct. 17, 2016), 19 pgs.

* cited by examiner

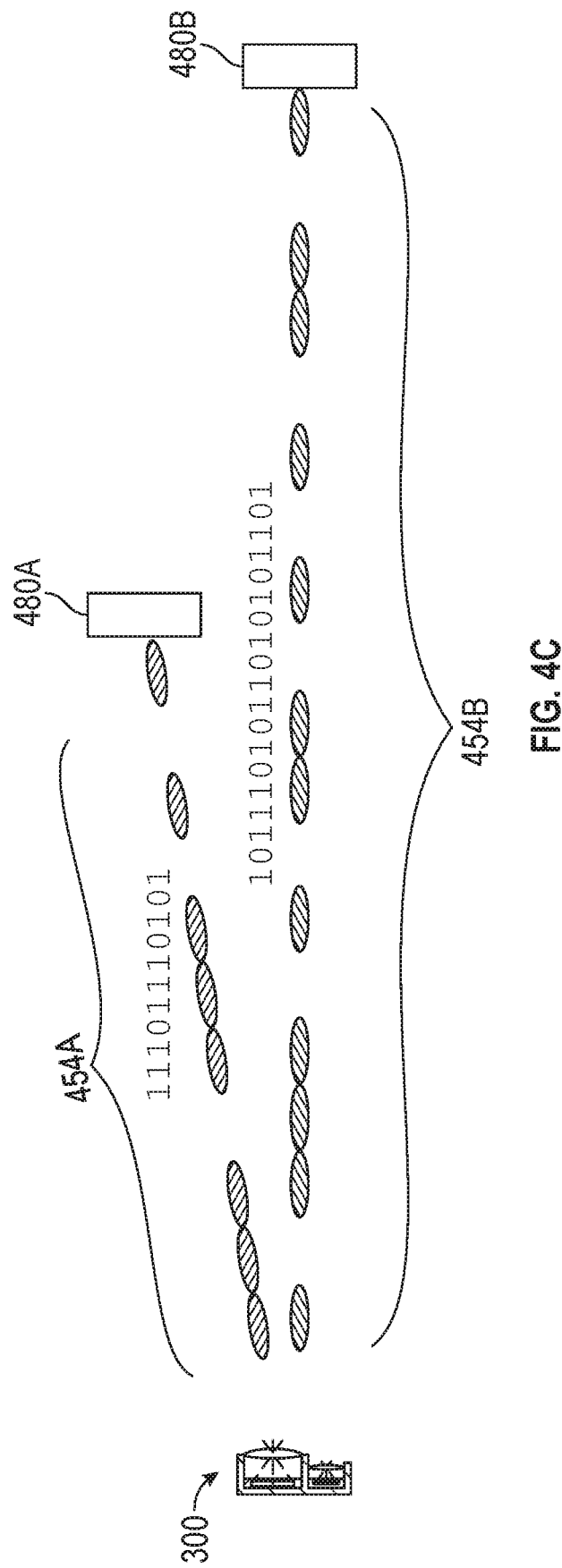

US 11,947,041 B2

CODED OPTICAL TRANSMISSION FOR OPTICAL DETECTION

FIELD OF THE DISCLOSURE

This document pertains generally, but not by way of limitation, to systems and techniques for illumination of a field-of-regard in an optical detection system, and more particularly, to use of apparatus and techniques to provide illumination using specified encoded transmit sequences.

BACKGROUND

In an optical detection system, such as a system for providing light detection and ranging (LIDAR), various automated techniques can be used for performing distance or "depth" estimation. Such systems can provide an estimate of a range to a target from an optical assembly, such as an optical transceiver assembly. Such detection techniques can include one or more "time-of-flight" determination techniques. In order to perform such detection, an illuminator can be used to transmit light toward a field-of-regard. The light can be scattered or reflected by objects with the field-of-regard and a detector can be used to register at least a portion of the scattered or reflected light. Generally, in a time-of-flight detection system, a received optical signal can be discretized and quantized, to provide a time-series (e.g., a series of discrete-valued samples with respect to time) representative of the received optical signal. The waveform can then be processed using one or more techniques to estimate the depth between the optical system and one or more targets in a field-of-view of the detection system. For example, one or more targets can be automatically tracked at least in part using the depth estimate.

SUMMARY OF THE DISCLOSURE

Optical detection schemes can be used in a variety of applications, including atmospheric observation, sensors for autonomous vehicles, and within industrial, commercial, or residential settings such as to provide sensors to facilitate autonomous operation or to enhance safety, for example. In one approach, a "monostatic" scheme can be used, such as including an optical transmitter and an optical receiver as a single assembly or mounted in a single location. Illumination of a field-of-regard surrounding the optical detection system can be performed using an optical illuminator that provides a beam. The beam can be scanned or otherwise steered across the field-of-regard, and in response, a receiver can detect light scattered or reflected by objects within the receiver's field-of-view.

Use of a scanned transmit approach (e.g., where only a relatively narrow solid angle or angular range is illuminated at any one instant) can simplify the receiver architecture. For example, a two-dimensional field-of-regard can be illuminated electronically or mechanically by the transmitter in a scanned manner, and a two-dimensional field-of-view can be observed in its entirety by the receiver, using a single-pixel optical detector for the receive element. Such an approach can provide a simple receiver architecture but can present challenges. For example, if a transmit beam-steerer only illuminates a single location at any instant, compiling depth information for an entire scene (e.g., a frame) may require a longer duration as compared to other approaches. In this sense, use of a scanned transmit approach may limit an achievable frame rate corresponding to a given resolution or may limit an achievable resolution associated with a given frame rate. A latency or frame rate can depend upon various factors such as one or more of an angular rate of the scanner, a beam geometry, a receive-chain latency (e.g., any time-to-digital conversion or depth estimation technique), or other factors.

In another approach, a "flash" transmit scheme can be used, such as to provide illumination of an entirety of a field-of-regard using a single optical transmitter element or an array of optical transmitters simultaneously transmitting a pulse of light. In such a flash scheme, a receiver can include multiple pixels. The separate pixels or detectors of the receiver provide spatial (e.g., angular) selectivity with respect to received light. However, the flash scheme can also present challenges. Limits on transmit intensity may inhibit one or more of a maximum range or a resolution achievable using a flash scheme. Resolution is also generally affected by a sensitivity and resolution (e.g., optics and pixel density) of the optical detector array used as a receiver.

In yet another approach, a frequency multiplexing scheme can be used, such as having a transmitter capable of transmitting light pulses having differing wavelengths. In this manner, multiple wavelengths can be transmitted contemporaneously, and separation of received signals can be performed in the frequency domain (e.g., using frequency-selective filters or detectors sensitive to particular transmitted wavelengths, as illustrative examples). Such a frequency-based multiplexing may substantially increase cost or complexity of the optical detection system.

The present inventor has recognized, among other things, that a coded transmission scheme can be used to provide scene illumination, such as to remedy one or more challenges mentioned above in relation to other optical detection approaches. For example, a transmitter can include individual transmit elements (e.g., monochromatic light sources such as vertical-cavity surface-emitting laser (VCSEL) structures, edge-emitting laser structures, or light-emitting-diode (LED) structures, as illustrative examples). The transmit elements can be controlled individually or in groups to provide specified amplitude-modulated (e.g., on-off-keyed) waveforms corresponding to specified transmit code sequences. Light reflected or scattered by an object can be detected by an optical receiver, such as a single-pixel detector. Contributions to the received optical signal corresponding to the respective transmit code sequences can be separated in the time-domain using a correlation-based technique, even when such contributions overlap in time. Regions of a field-of-regard illuminated by ones or groups of the transmit elements can be selected or adjusted, such as to provide controllable spatial (e.g., angular) selectivity of which portions of the field-of-regard are illuminated by particular transmit signals. Using the techniques described herein, reflected or scattered light from multiple locations in the field-of-view can be acquired contemporaneously.

A "time-of-flight" technique can be used to determine a distance (e.g., slant distance) between the optical receiver and an object. For example, the coded transmit techniques as described herein can be used to illuminate the object (or multiple objects), and a received optical signal can be discretized and quantized, to provide a time-series (e.g., a series of discrete-valued samples with respect to time) representative of the received optical signal. The time-series can be filtered or amplified. The waveform can then be processed using one or more techniques to provide a distance estimate. One or more targets can be automatically tracked at least in part using the distance estimate.

In an example, a technique, such as an automated method, can be used to provide illumination of a field-of-regard in an optical detection system. The technique can include generating a first optical transmit signal comprising a first waveform defined by a first code sequence, generating a second optical transmit signal comprising a second waveform defined by a second code sequence, the second code sequence separable from the first code sequence using a difference in respective correlation properties of the first and second code sequences, and contemporaneously transmitting the first and second optical transmit signals to illuminate the field-of-regard. Generally, the first and second code sequences comprise orthogonal code sequences. In an example, the field-of-regard can be divided into a plurality of regions, and the technique can include generating respective transmit signals for illumination of respective regions, and transmitting the respective transmit signals contemporaneously. In an example, transmitting the respective transmit signals contemporaneously comprises a transmit event, and a size of the regions can be adjusted between respective transmit events, such as according to a search technique. In an example, an optical signal can be received, corresponding to light scattered or reflected from an object in a field-of-view of an optical receiver, the scattered or reflected light elicited by the transmitted first and second optical transmit signals, and a portion of the received optical signal corresponding to the first optical transmit signal can be identified by correlating the received optical signal with a representation of the first code sequence.

In an example, a system for controlling illumination of a field-of-regard can include a control circuit comprising respective outputs for use in driving respective optical emitters amongst a plurality of optical emitters, the control circuit configured to generate a first optical transmit signal comprising a first waveform defined by a first code sequence, and to generate a second optical transmit signal comprising a second waveform defined by a second code sequence, the second code sequence separable from the first code sequence using a difference in respective correlation properties of the first and second code sequences. Generally, the outputs are configured to provide the first and second optical transmit signals contemporaneously to illuminate the field-of-regard using at least some of the optical emitters included amongst the plurality of optical emitters. In an example, the optical receiver can comprise a count of pixels as few as a single-pixel detector.

This summary is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 4C illustrates generally an illustrative example of a scheme where separate reflectors or scatters in the field-of-view of the receiver can contribute to a received optical signal, where a first portion of the received optical signal corresponds to a first optical transmit signal and a second portion of the received optical signal corresponds to a second optical transmit signal.

DETAILED DESCRIPTION

As mentioned above, an optical system can be used to automatically detect objects, such as obstacles, within a field-of-view. Various approaches can be used to perform such detection, including illuminating a field-of-regard using either a "flash" or scanned transmit scheme. Light that is reflected or scattered by objects in the field-of-regard can be detected and processed. The present inventor has developed circuits and techniques for illuminating a field-of-regard using optical emitters, such as an array of optical emitters. The optical emitters can be controllable such that individual ones or groups of emitters can be controlled to emit a corresponding optical transmit signal defined by a specified transmit code sequence. The transmit code sequences can have properties such that a particular transmit code sequence is de-correlated from other transmit code sequences, and from itself when time-shifted. In this manner, optical emitters can contemporaneously transmit respective optical transmit signals defined by different transmit sequences, and light received from the illuminated field can be processed to separate contributions from the various optical transmit signals using a correlation-based approach. Light incident upon an optical receiver can be converted to an electrical signal using a photodetector (e.g., a phototransistor or photodiode), or an array of such detectors, to provide a received optical signal. A time-to-digital conversion (TDC) can be performed to identify a depth of an object in the field-of-view of an optical receiver, such as by determining a sample index where correlation between a specified code sequence and a received optical signal peaks or is otherwise maximized.

Generally, the determined sample index corresponds to a time delay, and the distance to the object can be estimated by considering the time delay as a duration consumed by light propagating along a line-of-sight path length (e.g., a round trip path length) to the object. Depth estimation accuracy can be enhanced, such as by determining a subsample delay value, such as shown and described in relation to the apparatus and techniques of Policht, U.S. patent application Ser. No. 16/240,464, titled "Optical Distance Detection," and filed on Jan. 4, 2019, which is hereby incorporated by reference herein in its entirety, including its discussion of use of a reference waveform to perform time-to-digital conversion. In the context of the present teachings, a reference waveform or "kernel" used for cross-correlation during TDC can be a code sequence used to establish a respective optical transmit signal.

Figure 1:
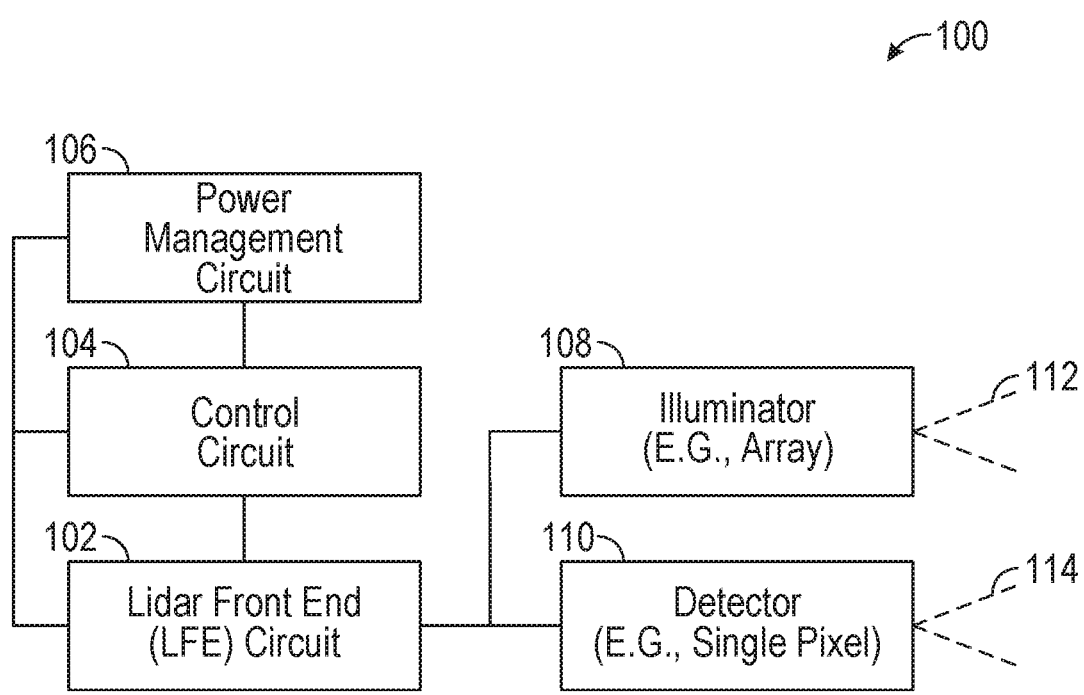
FIG. 1 illustrates generally a system, such as an optical detection system, that can include a transceiver comprising a light detection and ranging (LIDAR) "front end" circuit.

FIG. 1 illustrates generally a system, such as an optical detection system 100, that can include a transceiver comprising a light detection and ranging (LIDAR) "front end" circuit 102, along with an illuminator 108 (e.g., a diode or other laser module such as including output optics or beam steering capability to provide a specified transmit field-of-regard 112), and an optical detector 110 (e.g., an optical receiver comprising associated optics, such as can include a single photodetector with a field-of-view 114 or an array of such detectors). The LIDAR front end (LFE) circuit 102 can include one or more optical receive channels along with one or more analog-to-digital converters, such as shown illustratively in the example of FIG. 2. The optical detection system 100 can be included as a portion of a device such as an airborne or ground-based drone, a robot (e.g., in a factory or warehouse), or other device where detection of nearby targets such as obstacles can help to facilitate autonomous operation or enhance safety, for example.

The system 100 can include a control circuit 104 such as a microcontroller, microprocessor, or other circuit. The control circuit 104 can include a memory circuit, or the system 100 can include one or more separate volatile or non-volatile memory circuits. The system 100 can be communicatively coupled to or included as a portion of another electronic system such as the machine 800 shown and discussed in relation to FIG. 8. Returning to FIG. 1, the system can include a power management circuit 106 such as to provide one or more power supplies for, or power control to, other blocks of the system 100. In an example, the system 100 comprises a hardware module, such as integrated on or within a single device package or substrate. In an example, the system 100 comprises an integrated circuit or integrated module incorporating one or more of the power management circuit 106, the control circuit 104, and the LIDAR front end (LFE) circuit 102. The illuminator 108 can include an array of optical emitters, such as shown illustratively in the example of FIG. 5. Referring back to FIG. 1, the detector 110 can include a photosensor (e.g., a photodiode or phototransistor, or other light-sensitive device). Examples include an avalanche photodiode, silicon photomultiplier, single-photon avalanche device, or a PIN photodiode, as illustrative examples. In an example, the illuminator 108 and the detector 110 can be included as a portions of a monostatic optical transceiver assembly, such as having a biaxial arrangement as shown illustratively in the example of FIG. 3. The system 100 of FIG. 1 can include or use aspects of other examples described herein, such as to illuminate the field-of-regard 112 using contemporaneously-transmitted optical transmit signals corresponding to respective optical transmit code sequences.

Figure 2:
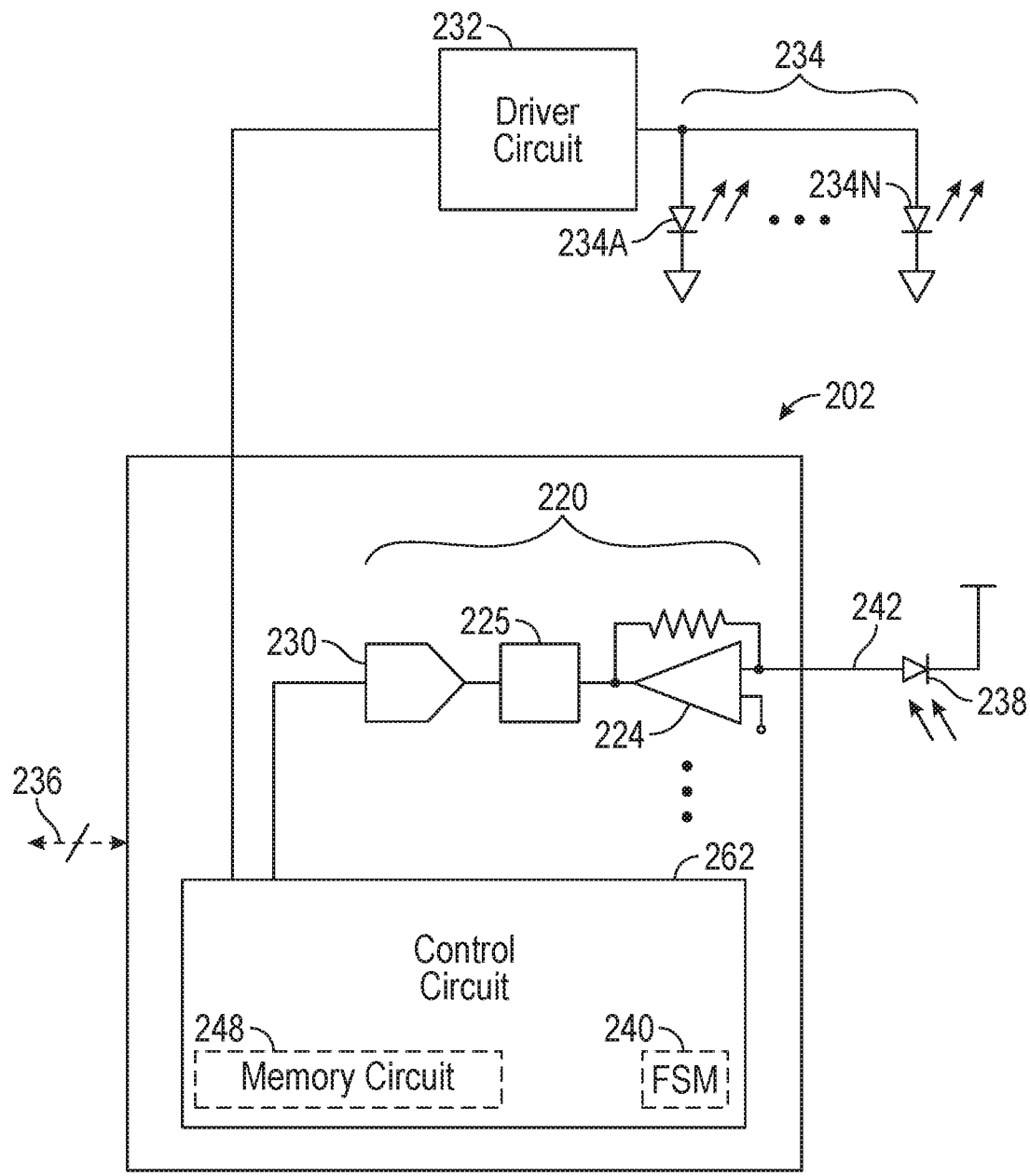
FIG. 2 illustrates generally an example comprising a LIDAR front end comprising optical emitters and an optical receiver.

FIG. 2 illustrates generally at least a portion of a system, such as an optical detection system, comprising a light detection and ranging (LIDAR) "front end" circuit 202. A receive channel can include an analog signal chain 220, such as comprising an input 242 to receive a signal from a photosensor, a receive amplifier 224 (e.g., a transimpedance amplifier (TIA) coupleable to an anode of a photodiode 238), and a preamplifier 225, such as configured to apply a specified compensation signal to a received optical signal output by the amplifier 224 to provide DC balance (e.g., to remove a bias from the received optical signal). A differential output of the preamplifier 225 can be provided to an analog-to-digital converter (ADC) circuit 230. In the example of FIG. 2, a single receive channel is shown (such as corresponding to use of a single-pixel detector), but multiple channels can also be used, such as coupled to an array of photosensors.

The "front end" circuit 202 can include a control circuit 262, such as having control logic and a register map to provide control of various blocks of the "front end" circuit 202. The control circuit can include or can be communicatively coupled with a memory circuit 248, such as a Static Random-Access Memory (SRAM). Other portions of the system, such as a micro-controller or digital signal processor can retrieve digitized received optical signal data from the memory circuit 248, such as to apply filtering or perform time-to-digital conversion. The control circuit 262 can have a microcontroller or microprocessor architecture, or other architecture. In an illustrative example, the control circuit 262 can include a register map, combinational logic, and one or more finite state machines (FSMs), such as an FSM 240.

Generally, the LFE circuit 202 can control an optical emitter 234 (e.g., comprising one or more individually-controllable light emitters 234A through 234N), such as coupled to a driver circuit 232. The control circuit 262 can provide digital control signals to the driver circuit 232 such as to control the light emitters 234A through 234N to contemporaneously emit optical transmit signals defined by respective optical transmit code sequences, as shown and described in relation to the other examples. Illumination of the scene and a corresponding acquisition by the LFE circuit 202 can be referred to as a frame acquisition. Multiple acquisitions can be performed, and the resulting received optical signal waveforms can be aggregated such as via summing or averaging. For example, summing a series of time-aligned received optical waveforms can provide a processing gain, and a count of such sums can be a parameter that is automatically adjusted to provide another form of automatic gain control (AGC) behavior. Such aggregation can be performed in hardware, such as using digital logic and timing control circuits configured by hardware registers and without requiring intervention by a general-purposes processor circuit. In an example, a delay interval between frame acquisitions can be either fixed or randomized.

Figure 3:
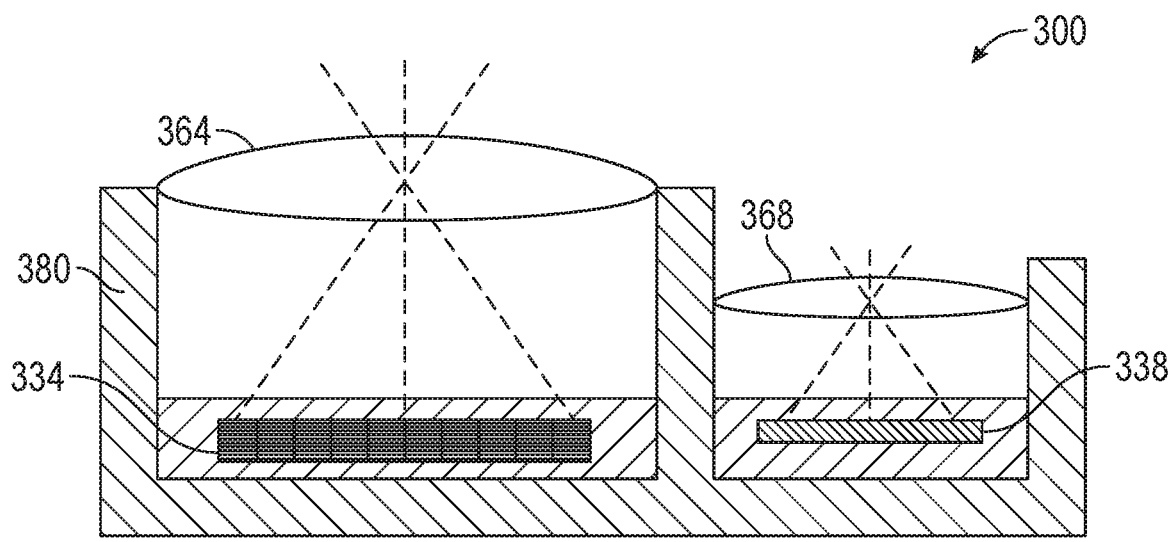
FIG. 3 illustrates generally an illustrative example comprising at least a portion of a monostatic optical transceiver having a biaxial arrangement.

FIG. 3 illustrates generally an illustrative example comprising at least a portion of a monostatic optical transceiver 300 having a biaxial arrangement. As mentioned in relation to other examples herein, an optical detection system can include an optical emitter 334 (e.g., an array of light sources such as VCSELs or LEDs, as illustrative examples). An output optic 364 comprising a lens or other structure can be used to focus, collimate, or re-shape the transmitted light from the optical emitter 334 to illuminate a field-of-regard. An optical detector 338 can be located nearby, such as to image a field-of-view corresponding to the field-of-regard. The optical detector 338 can also be coupled to the field-of-view through an input optic 368. The optical transmitter 334, optical detector 338, and optics 364 and 368 can be fixed by a commonly-shared housing 380. Other portions of an optical detection system can be included within the housing 380 or coupled to the housing. In this manner, a compact optical detection system can be provided, such as for incorporation with robotic devices or for other applications including autonomous aircraft or vehicles, or sensing systems more generally, such as to augment the information available to human operators.

Figure 4A:
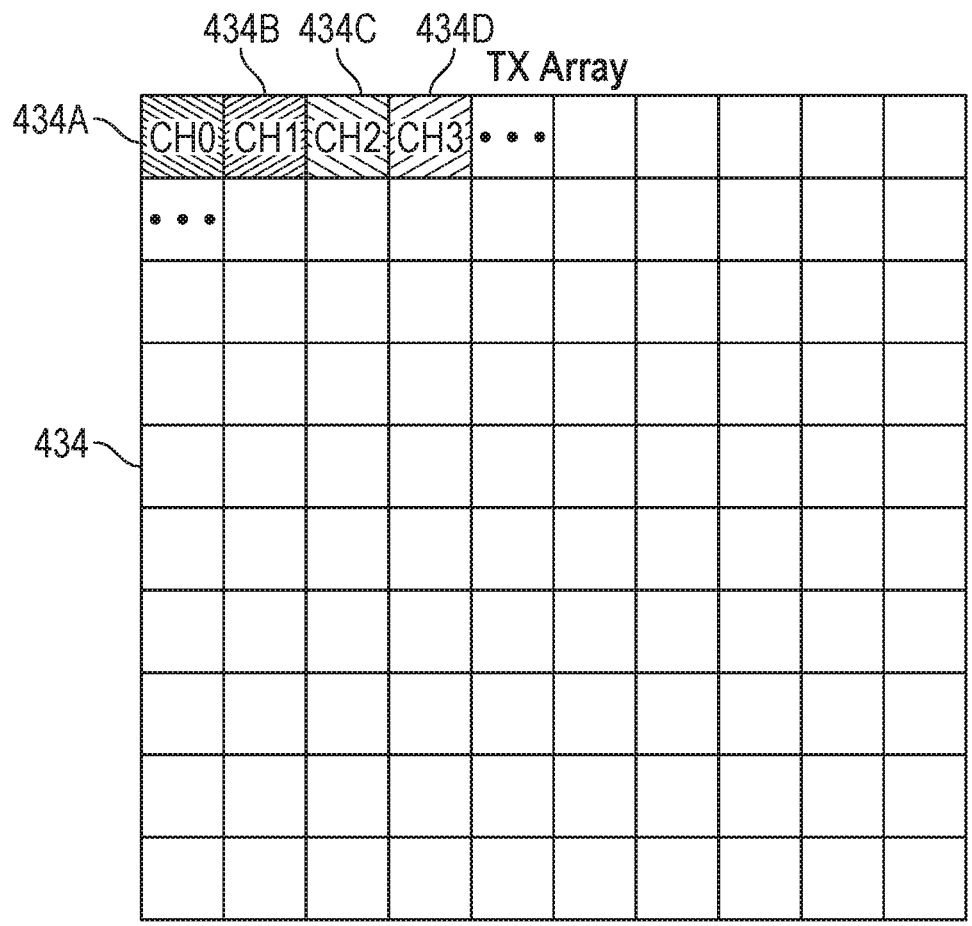
FIG. 4A illustrates generally an illustrative example of establishing optical transmit signals corresponding to respective channels and assigning the channels to transmit elements.

FIG. 4A illustrates generally an illustrative example of establishing optical transmit signals corresponding to respective channels and assigning the channels to transmit elements. In FIG. 4A, an array 434 of optical emitters such as lasers or LED devices can be controlled such that individual ones of the optical emitters or groups of optical emitters define respective channels. For example, four optical emitters 434A, 434B, 434C, and 434D forming a portion of the array 434 can each be controlled to emit respective optical transmit signals. The optical transmit signals can be defined by unique transmit code sequences. For example, the transmit code sequences can be orthogonal binary codes that define amplitude-modulated (e.g., on-off keyed) waveforms used to drive respective emitters in the array 434. Each optical emitter can include optics to direct light from the optical emitter to a corresponding portion of a total field-of-regard. Such optics can include lense-lets or a single imaging lens as mentioned in relation to other examples herein. In the examples described herein, the array 434 includes a regular grid of square elements, but other array configurations can be used (e.g., such arrays need not be square, but could instead include other shapes such as circular or rectangular arrangements, and the shape and arrange of individual emitters need not be square arranged on a rectangular grid).

Figure 4B:
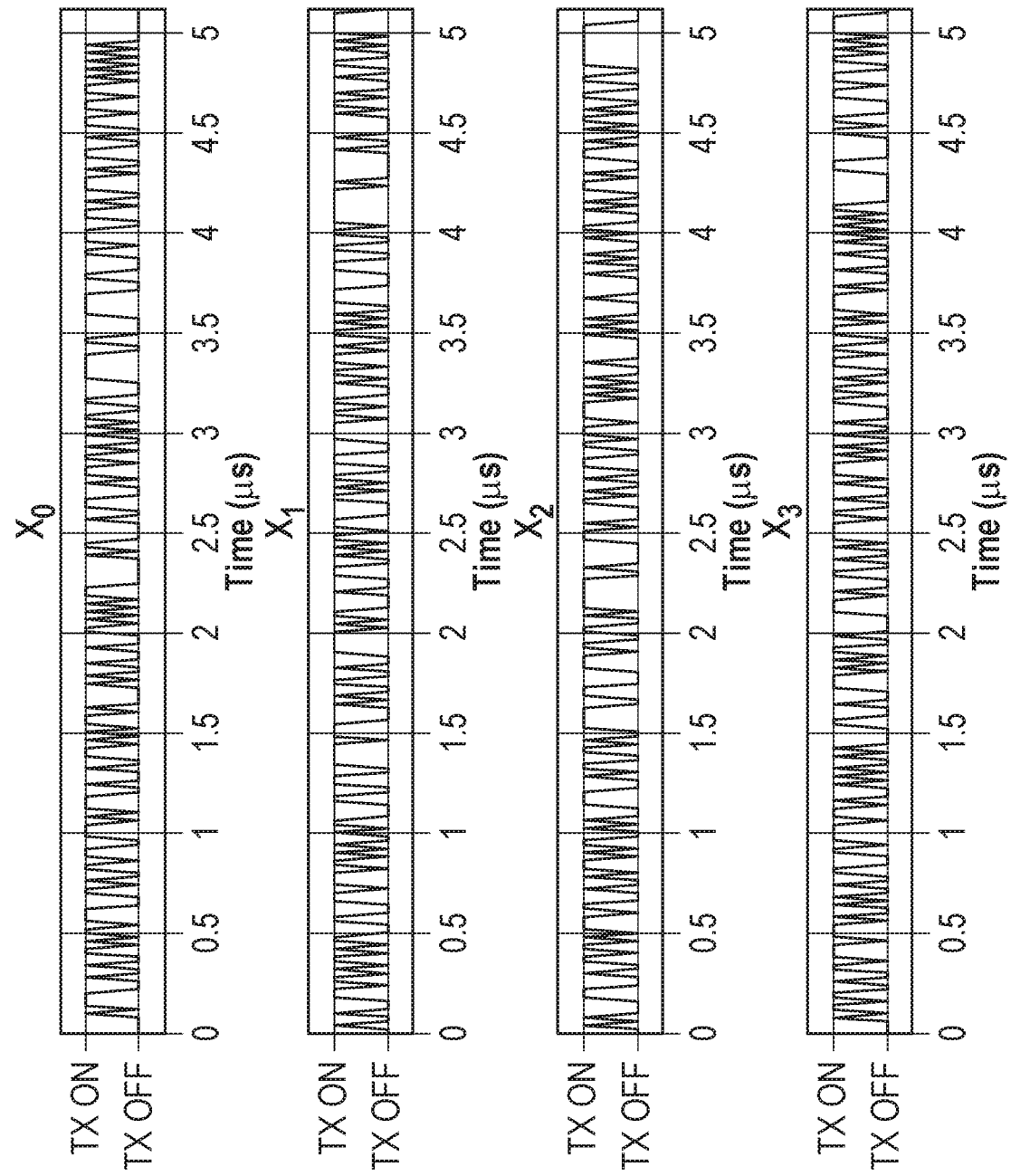
FIG. 4B illustrates generally an illustrative example of transmit code sequences corresponding to respective channels, such as can be assigned to the transmit elements shown in FIG. 4A.

FIG. 4B illustrates generally an illustrative example of transmit code sequences corresponding to respective channels, such as can be assigned to the transmit elements shown in FIG. 4A. The code sequences can correspond to maximum length sequences, such as generated "on the fly" using a logic circuit structure such as a linear-feedback shift register (LFSR). Alternatively, or in addition, code sequences can be stored such as in a look-up table (LUT) or using another structure.

The respective sequences shown in the illustrative example of FIG. 4B differ from each other and can be used to define respective modulated waveforms to drive respective optical emitters as shown in FIG. 4A. The code sequences shown illustratively in FIG. 4B are separable from each other using cross-correlation between a received signal and a respective representation of a code sequence used for transmission. The illustrative examples of FIG. 4B, FIG. 4C, and FIG. E show four waveforms. However, the techniques described herein are not limited to four channels, and higher channel counts can be used (e.g., such that each optical emitter in an array is driven with a unique waveform corresponding to a unique transmit sequence). In FIG. 4B, four code sequences are shown, $x_n$ for n={0,3}. The sequences may appear to be a random distribution of logic high and logic low (e.g., "on/off") states, superficially, but such sequences are examples of orthogonal codes. Each example is orthogonal to time-shifts of itself as well as adjacent channel sequences. The main class of sequences used in this illustrative example are maximum-length sequences, and sub-class is a selection of such M-sequences which reduce or otherwise minimize a result of cross-correlation with all other sequences. Illustrative examples of transmit code sequences having correlation properties suitable for use herein include various Gold codes. Generally, a transmit code sequence can be established having correlation properties such that a set of cross-correlations is bounded in a manner allowing respective received signals to be separated from each other in the presence of noise (e.g., within the a specified link budget or according to other criteria).

FIG. 4C illustrates generally an illustrative example of a scheme where separate reflectors or scatters in the field-of-view of the receiver can contribute to a received optical signal, where a first portion of the received optical signal corresponds to a first optical transmit signal and a second portion of the received optical signal corresponds to a second optical transmit signal. For example, a monostatic optical transceiver 300 can illuminate a field-of-regard using a first optical transmit signal 454A and a second optical transmit signal 454B, such as emitted contemporaneously by respective optical emitters. The optical emitters can provide spatial selectivity, such that the first optical transmit signal 454A generates a first reflection from a first object 480A, and the second optical transmit signal 454B generates a second reflection from a second object 480B. An optical receiver included as a portion of the optical transceiver 300 will generally receive optical reflections from the first and second objects 480A and 480B that overlap in time. For example, a single photodetector and associated optics can be used to provide an entirety of the receiver field-of-view (e.g., an avalanche photodiode, silicon photomultiplier, or a PIN photodiode, as illustrative examples). Accordingly, a received optical signal from the photodetector would generally include contributions from each of the first and second optical transmit signals 454A and 454B that can then be separated from the received signal using a correlation-based technique, for example.

Figure 4D:
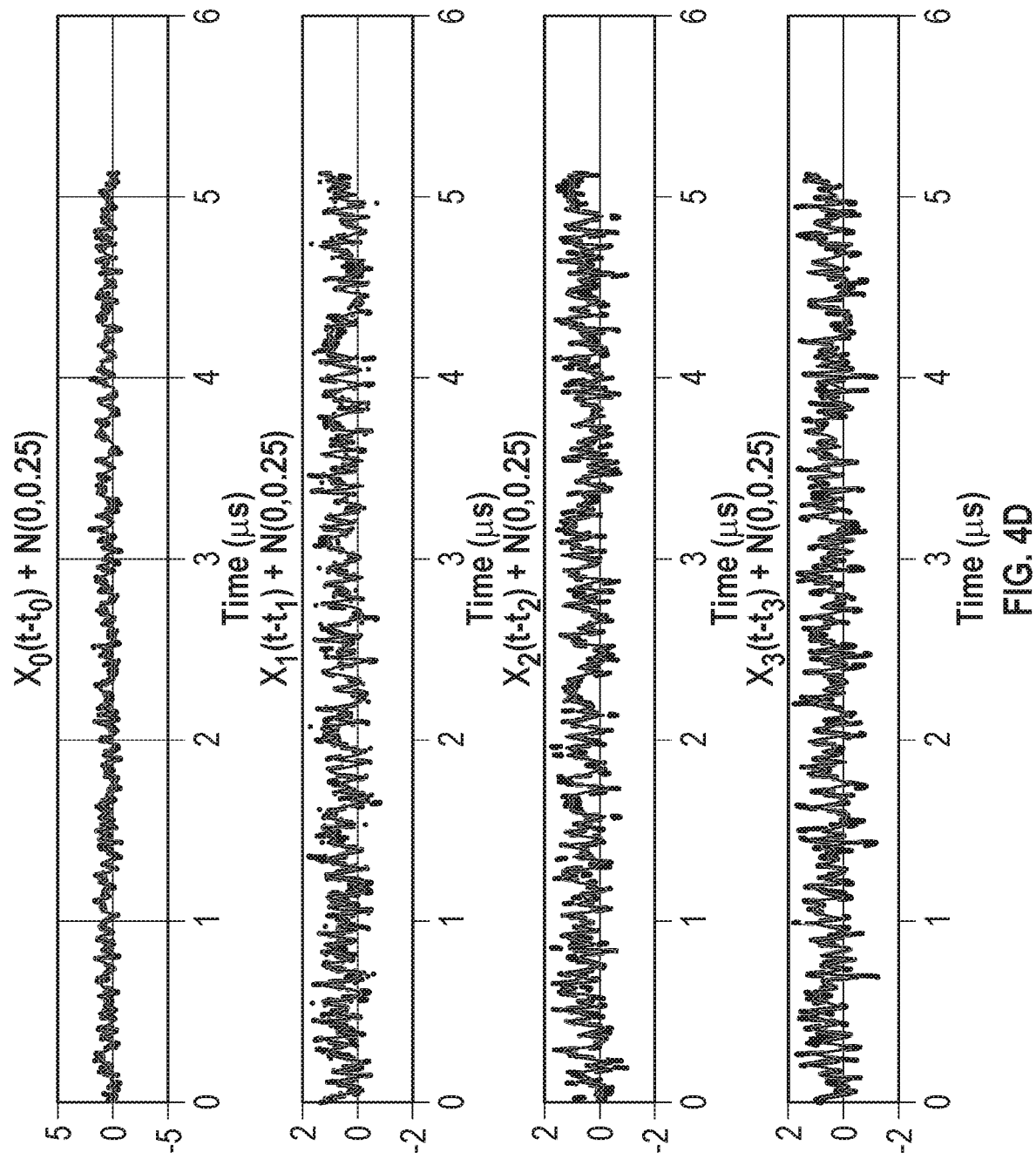
FIG. 4D illustrates generally an illustrative example of a simulation of individual optical signal contributions corresponding to different optical transmit signals, where a received optical signal would include a sum of such optical signal contributions.

FIG. 4D illustrates generally an illustrative example of a simulation of individual optical signal contributions corresponding to different optical transmit signals, where a received optical signal would include a sum of such optical signal contributions. Each waveform $x_n$ (corresponding to the code sequences shown in FIG. 4B) has been transformed into a time delayed version of itself with added noise. Generally, a received optical signal comprises a sensor current that is a summation of all of these returns, such as represented as "y." For M targets in a scene and N pixels (corresponding to N unique transmit code sequences), y(t) is shown below:

$$y(t) = \sum_{m=0}^{M} \sum_{n=0}^{N} \sigma_m x(t - t_m) + \text{Shot\_Noise}_m(t) + \text{Thermal\_Noise}(t)$$

Figure 4E:
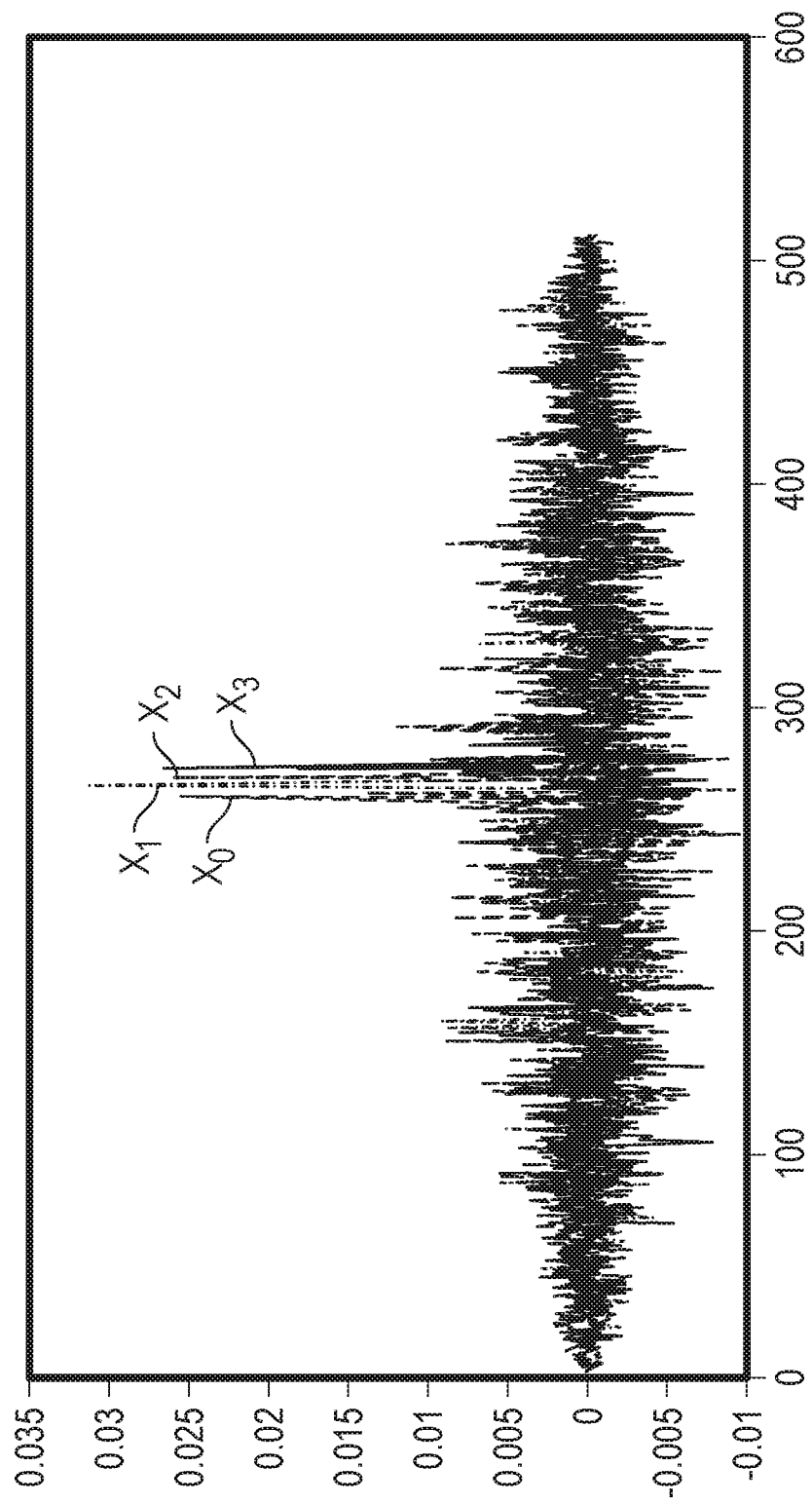
FIG. 4E illustrates generally an illustrative example of simulated cross-correlation plots corresponding to different transmit code sequences cross correlated with a simulated received optical signal, and showing respective peaks corresponding to a sample index where the cross-correlation value is maximized for a particular code sequence.

In the equation above, am can represent a coefficient that captures other scaling effects. FIG. 4E illustrates generally an illustrative example of simulated cross-correlation plots corresponding to different transmit code sequences cross correlated with a simulated received optical signal, y(t), and showing respective peaks corresponding to a sample index where the cross-correlation value is maximized for a particular code sequence. The respective plots shown in FIG. 4E correspond to performing a cross-correlation of each transmitted waveform ($x_1$, $x_2$, $x_3$, $x_4$) with a discrete-time version, y[n], of the received time-domain waveform y(t). As can be seen from FIG. 4E, distinct peaks occur, which each correspond to a respective sample index. For example, sample indices where such peaks occur correspond to times-of-flight for light transmitted and reflected (e.g., bounced) off respective objects at different depths with respect to the receiver. While this example uses cross correlation, various time-to-digital conversion techniques can be used, such as in Policht, U.S. patent application Ser. No. 16/240,464, titled "Optical Distance Detection," and filed on Jan. 4, 2019, as mentioned previously.

Figure 5:
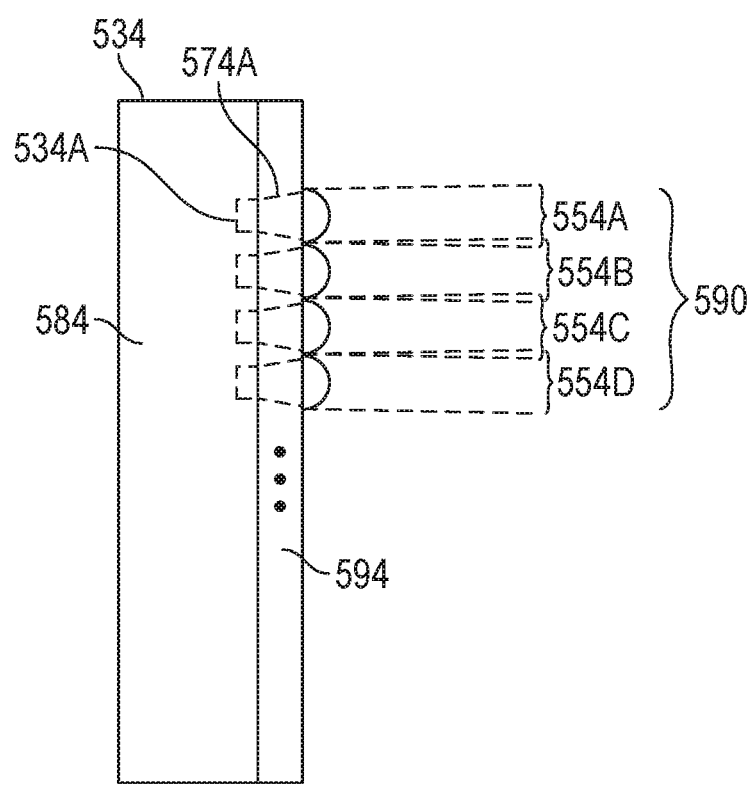
FIG. 5 illustrates generally an example of an optical emitter assembly, such as can include an array of lens structures.

FIG. 5 illustrates generally an example of an optical emitter assembly 584, such as can include an array of lens structures 594. As mentioned elsewhere, the apparatus and techniques described herein can include use of an array 534 of transmit elements and as few as a single receive element. In this manner, if the transmit array 534 is defined as having dimensions of N emitters times M emitters (e.g., an N×M array), each element 534A in the array 534 can be driven with a unique optical transmit signal so that a resulting field-of-view 590 can be imaged using as few as a single pixel receiver. Various types of emissive arrays can be used, such as laser-based or LED-based arrays. For example, a microLED or OLED display can be used as an optical source, such as optically coupled with an array of lens structure 594. The lens structures can shape and direct an optical signal (e.g., a signal 574A) in such a manner that fields 554A, 554B, 554C, 554D corresponding to respective emitters can be established having slightly overlapping parallel divergences to provide coverage of an entire receiver field-of-view 590. The example of FIG. 5 is illustrative and other emitter topologies can be used to provide the optical transmitter, as mentioned in relation to other examples herein.

Figure 6A:
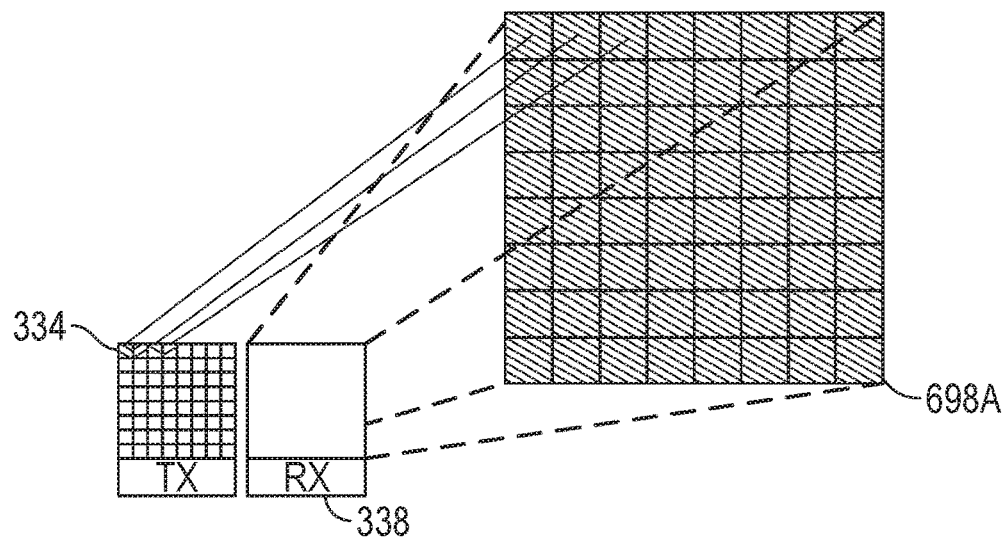
FIG. 6A, FIG. 6B, and FIG. 6C illustrate generally various examples showing different channel assignments that can be used to illuminate different regions of a field-of-regard.
Figure 6B:
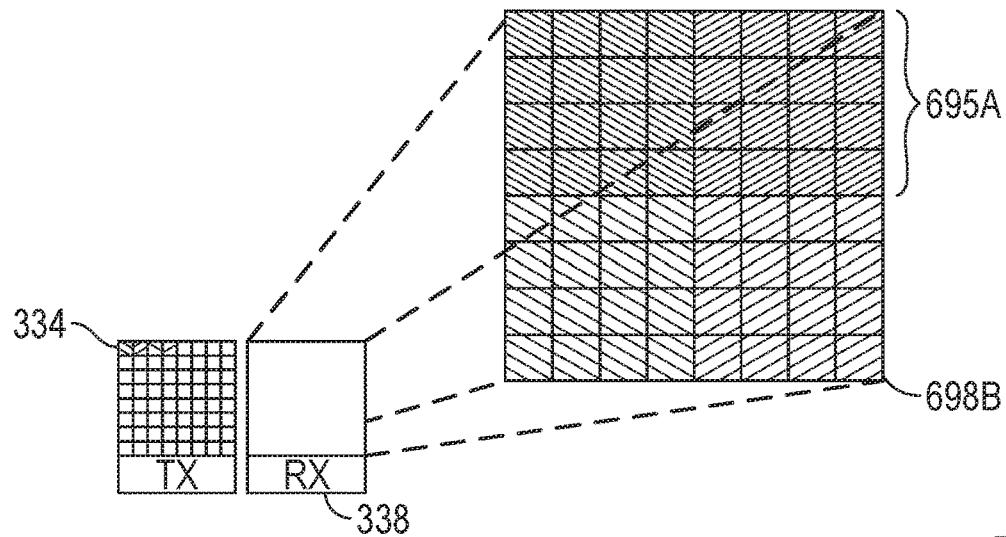
Figure 6C:
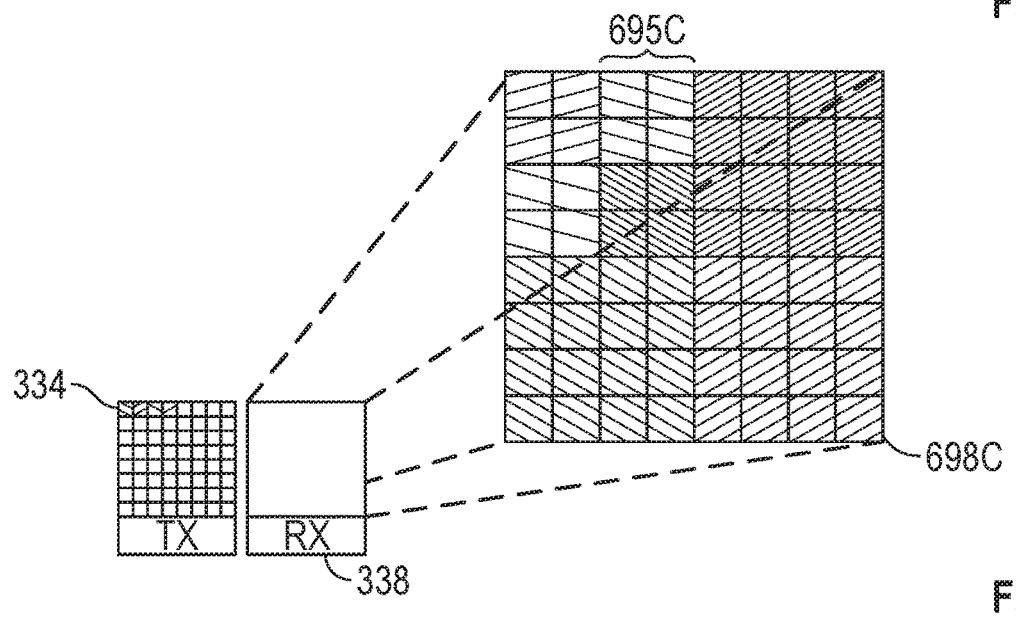

FIG. 6A, FIG. 6B and FIG. 6C illustrate generally various examples showing different channel assignments that can be used to illuminate different regions of a field-of-regard. An optical emitter 334 can provide illumination of a field-of-regard 698A, such as divided into regions. The regions can be as small as corresponding one-to-one with individual emitters in an array formed by the optical emitter 334. A field-of-view of the optical detector 338 can be established to receive an optical signal corresponding to reflections from objections illuminated by the optical emitter 334. In certain conditions, it may be desirable to provide a unique optical transmit signal for each pixel in the field-of-regard, to provide maximum resolution. In other conditions, groups of emitters or transmit pixels can be established to define respective regions of the field-of-regard.

For example, in a mode where an optical detection system is initially searching for objects, an entirety of the field-of-regard 698A may be illuminated by driving most or all of the optical emitters with the same transmit code sequence. If a signal is detected, then, for example, as shown in FIG. 6B, the field-of-regard 698B can be subdivided into smaller regions with each region 695A corresponding to a group of optical emitters driven by the same optical transmit signal. For example, as shown in FIG. 6B, the field-of-regard has been divided by two in each axis. In FIG. 6C, for example, if a search is being performed, the field-of-regard 698C can be further sub-divided to define even smaller regions (e.g., adjusting the region size to provide a region 695C). The size of the regions need not be uniform. For example, if a particular quadrant indicated the presence of an object using the illumination code assignment of FIG. 6B, then just that one quadrant can be further subdivided to define smaller regions. Such division can continue until a specified resolution is reached (e.g., down to single-pixel resolution), such as according to a search technique. An example of a search technique includes a quadtree approach, as an illustrative example. In an example, in regions of the field-of-regard 698C where no return is detected, a single, commonly-shared optical transmit signal can be used to drive the optical emitters, such as to help reduce or minimize cross-correlation noise related to processing of other regions of the field-of-regard 698C.

Figure 7:
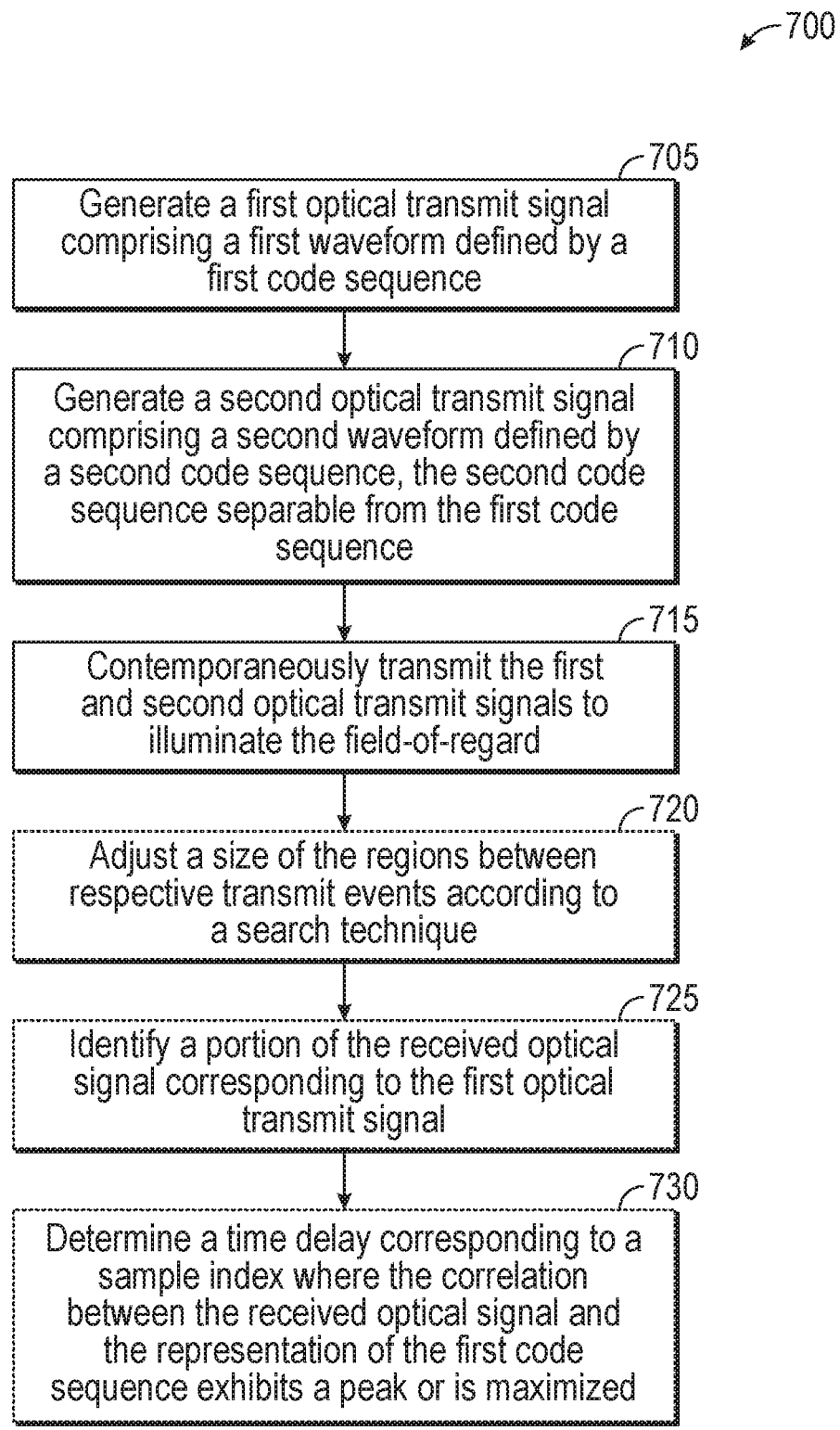
FIG. 7 illustrates generally a technique, such as a method, that can be used to provide illumination using optical transmit signals defined by respective code sequences, such as shown and described in relation to other examples herein.

FIG. 7 illustrates generally a technique, such as a method, that can be used to provide illumination using optical transmit signals defined by respective code sequences, such as shown and described in relation to other examples herein. At 705, a first optical transmit signal can be generated. The optical transmit signal can include a waveform defined by a first code sequence. At 710, a second optical transmit signal can be generated, such as comprising a second waveform defined by a second code sequence. The first and second code sequences can be orthogonal codes, separable from each other by correlation properties of each code. At 715, the first and second optical transmit signals can be transmitted contemporaneously to illuminate a field-of-regard. For example, an array of optical elements can be used to transmit a plurality of optical transmit signals contemporaneously, the transmit signals defined by respective unique orthogonal code sequences. At 720, the field-of-regard can be divided into multiple regions, and a size of the regions can be adjusted between respective transmit events, such as according to a search technique. At 725, an optical signal can be received, and a portion of the optical signal corresponding to the first optical transmit signal can be identified, such as using a correlation-based approach. At 730, a time-delay can be identified, such as corresponding to a sample index where the correlation between the received optical signal and a representation of the first code sequence exhibits a peak or is maximized.

As an illustrative example, an optical detector can be coupled to a receive amplifier circuit and an analog-to-digital converter (ADC) circuit, and a memory circuit. A control circuit can be configured to control the optical receiver and the ADC circuit to establish discrete-time samples comprising a time-domain waveform corresponding to a received optical signal, and compare the time-domain waveform with the reference waveform to determine a first delay value corresponding to a sample index where the time-domain waveform and the reference waveform are aligned. For example, a discretized time-domain waveform can be shifted by the first delay value, and a remaining phase offset of the time-domain waveform can be used to determine a second delay value comprising a fraction of a sample interval. In this manner, a time-of-flight estimate corresponding to a reflection received from an object in the field-of-view of the optical receiver can be performed at a resolution finer than the sample-interval resolution.

Figure 8:
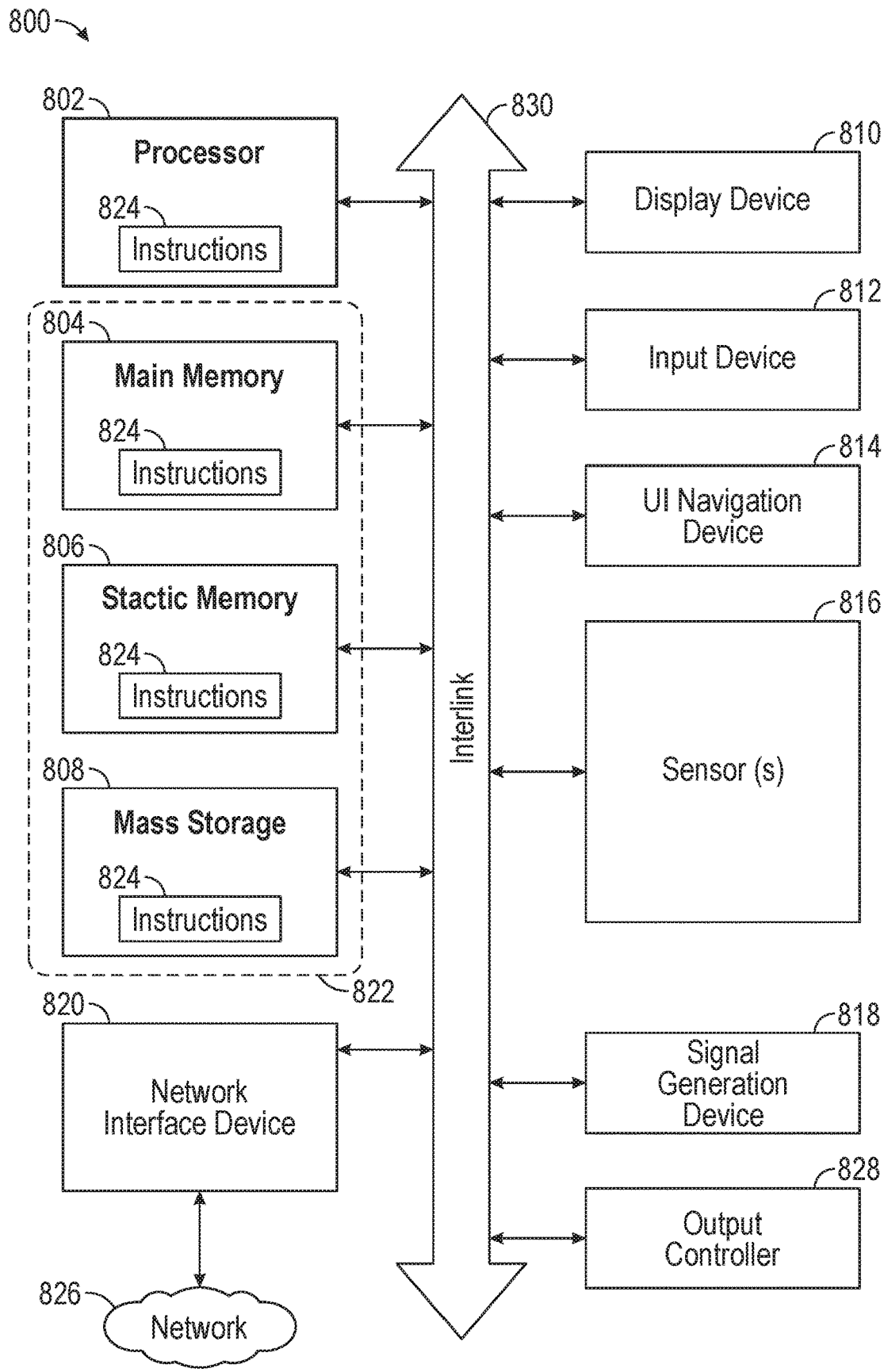
FIG. 8 illustrates a block diagram of an example comprising a machine upon which any one or more of the techniques (e.g., methodologies) discussed herein may be performed.

FIG. 8 illustrates a block diagram of an example comprising a machine 800 upon which any one or more of the techniques (e.g., methodologies) discussed herein may be performed. The machine 800 may be included as a portion of elements shown in the system 100 of FIG. 1. In various examples, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a personal computer (PC), a tablet device, a personal digital assistant (PDA), a mobile telephone, a web appliance, a network router, switch or bridge, a portable (e.g., hand-held) sensing device such as including a microprocessor or microcontroller, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. "Circuitry" refers generally a collection of circuits implemented in tangible entities that include hardware (e.g., simple circuits, gates, logic elements, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware comprising the circuitry may include variably connected physical components (e.g., execution units, transistors, simple circuits, etc.) including a computer readable medium physically modified (e.g., magnetically, electrically, such as via a change in physical state or transformation of another physical characteristic, etc.) to encode instructions of the specific operation.

In connecting the physical components, the underlying electrical properties of a hardware constituent may be changed, for example, from an insulating characteristic to a conductive characteristic or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

Machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 816, a signal generation device 818 (e.g., a speaker), a network interface device 820, and one or more sensors 821, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine readable media.

While the machine readable medium 822 is illustrated as a single medium, the term "machine readable medium" may include a single medium or multiple media (e.g., a centralized or distributed database, and/or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, and optical and magnetic media. Accordingly, machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic or other phase-change or state-change memory circuits; magnetic disks, such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks such as conforming to one or more standards such as a 4G standard or Long Term Evolution (LTE)), Plain Old Telephone (POTS) networks, and wireless data networks (e.g., Institute of Electrical and Electronics Engineers (IEEE) 802.11 family of standards known as Wi-Fi®), the IEEE 802.15.4 family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software.

Various Notes

Each of the non-limiting aspects in this document can stand on its own, or can be combined in various permutations or combinations with one or more of the other aspects or other subject matter described in this document.

The above detailed description includes references to the accompanying drawings, which form a part of the detailed description. The drawings show, by way of illustration, specific embodiments in which the invention can be practiced. These embodiments are also referred to generally as "examples." Such examples can include elements in addition to those shown or described. However, the present inventor also contemplates examples in which only those elements shown or described are provided. Moreover, the present inventor also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A method for providing illumination of a field-of-regard in an optical detection system, the method comprising:
generating a first optical transmit signal comprising a first waveform defined by a first code sequence;
generating a second optical transmit signal comprising a second waveform defined by a second code sequence, the second code sequence separable from the first code sequence using a difference in respective correlation properties of the first and second code sequences;
contemporaneously transmitting the first and second optical transmit signals to illuminate respective regions defining the field-of-regard, wherein transmitting the respective transmit signals contemporaneously comprises a transmit event; and
adjusting an angular range of the regions between respective transmit events.

2. The method of claim 1, wherein the first and second code sequences comprise orthogonal code sequences.

3. The method of claim 1, wherein the contemporaneously transmitting the first and second optical transmit signals includes transmitting the first optical transmit signal using a first emitter amongst a plurality of emitters, and transmitting the second optical transmit signal using a second emitter amongst the plurality of emitters.

4. The method of claim 3, wherein the first emitter is arranged to illuminate a first region of the field-of-regard, and the second emitter is arranged to illuminate a different second region of the field-of-regard.

5. The method of claim 4, wherein the adjusting the angular range of the regions comprises changing the optical transmit signal that is transmitted by at least one of the first emitter or the second emitter between respective transmit events.

6. The method of claim 1, wherein the adjusting the angular range of the regions comprises subdividing a region from a prior transmit event into multiple regions having corresponding assigned code sequences.

7. The method of claim 1, comprising:
receiving an optical signal corresponding to light scattered or reflected from an object in a field-of-view of an optical receiver, the scattered or reflected light elicited by the transmitted first and second optical transmit signals; and identifying a portion of the received optical signal corresponding to the first optical transmit signal by correlating the received optical signal with a representation of the first code sequence.

8. The method of claim 7, comprising determining a time delay corresponding to a sample index where a correlation between the received optical signal and the representation of the first code sequence exhibits a peak or is maximized.

9. The method of claim 8, comprising determining a distance to the object using the determined time delay.

10. A method for performing optical detection using encoded transmit sequences, the method comprising:
  receiving an optical signal corresponding to light scattered or reflected from an object in a field-of-view of an optical receiver, the scattered or reflected light elicited by contemporaneously transmitted first and second optical transmit signals, the first optical transmit signal comprising a first waveform defined by a first code sequence and the second optical transmit signal comprising a second waveform defined by a second code sequence, wherein the first optical transmit signal and the second optical transmit signal illuminate respective regions defining a field-of-regard, wherein transmitting the respective transmit signals contemporaneously comprises a transmit event;
  determining a first sample index where a correlation between the received optical signal and a representation of the first code sequence is enhanced;
  estimating a depth to the object corresponding to the determined first sample index; and
  adjusting an angular range of the regions between respective transmit events.

11. The method of claim 10, comprising determining a second time delay corresponding to a second sample index where a correlation between the received optical signal and a representation of the second code sequence is enhanced.

12. The method of claim 11, wherein a first portion of the received optical signal corresponding to the first optical transmit signal is received from a first region of the field-of-view and a second portion of the received optical signal corresponding to the second optical transmit signal is received from a second region of the field-of-view; and
  wherein the first and second portions overlap temporally.

13. The method of claim 12, comprising illuminating the first region using at least one emitter amongst a plurality of emitters, and illuminating the second region using at least one other emitter amongst the plurality of emitters.

14. The method of claim 13, wherein the adjusting an angular range of the regions comprises adjusting a size of respective illuminated regions by grouping respective ones of the emitters together to transmit a commonly-shared transmit signal contemporaneously.

15. A system for controlling illumination of a field-of-regard, the system comprising:
  a control circuit comprising respective outputs for use in driving respective optical emitters amongst a plurality of optical emitters, the control circuit configured to generate a first optical transmit signal comprising a first waveform defined by a first code sequence, and to generate a second optical transmit signal comprising a second waveform defined by a second code sequence, the second code sequence separable from the first code sequence using a difference in respective correlation properties of the first and second code sequences;
  wherein the outputs are configured to provide the first and second optical transmit signals contemporaneously to illuminate respective regions defining the field-of-regard using at least some of the optical emitters included amongst the plurality of optical emitters, wherein transmitting the respective transmit signals contemporaneously comprises a transmit event;
  wherein an angular range of the regions is adjusted between respective transmit events.

16. The system of claim 15, further comprising the plurality of emitters;
  wherein the control circuit is configured to control the outputs to provide the first and second optical transmit signals including transmitting the first optical transmit signal using a first emitter amongst the plurality of emitters, and transmitting the second optical transmit signal using a second emitter amongst the plurality of emitters.

17. The system of claim 15, comprising an optical receiver configured to receive an optical signal corresponding to light scattered or reflected from an object in a field-of-view of the optical receiver, the scattered or reflected light elicited by the transmitted first and second optical transmit signals; and
  wherein the control circuit is configured to identify a portion of the received optical signal corresponding to the first optical transmit signal by correlating the received optical signal with a representation of the first code sequence.

18. The system of claim 17, wherein the optical receiver comprises a single-pixel receiver.

19. The system of claim 17, wherein the optical receiver comprises:
  a receive amplifier circuit and an analog-to-digital converter (ADC) circuit; and
  a memory circuit; and
  wherein the control circuit is coupled to the optical receiver, the ADC circuit, and the memory circuit, the control circuit configured to control the optical receiver and the ADC circuit to establish discrete-time samples comprising a time-domain waveform corresponding to a received optical signal, compare the time-domain waveform with a reference waveform to determine a first delay value corresponding to a sample index where the time-domain waveform and the reference waveform are aligned.

20. The system of claim 19, wherein the control circuit is configured to shift the time-domain waveform using the first delay value, and determine a remaining phase offset of the time-domain waveform to determine a second delay value comprising a fraction of a sample interval.

* * * * *